Patented Jan. 15, 1952

2,582,323

UNITED STATES PATENT OFFICE 2,582,323

ROTARY DRILLING FLUIDS

Paul W. Fischer, Long Beach, Calif., assignor to Union Oil Company of California, Los Angeles, Calif., a corporation of California No Drawing. Application February 13, 1948, Serial No. 8,281

17 Claims. (Cl. 252—8.5)

This invention relates to fluids employed in the drilling of oil and gas wells, to a method for preparing such fluids, and to a method for drilling oil and gas wells employing these fluids. More particularly, this invention relates to drilling fluids which comprise an emulsion of oil and water to which various agents have been added to impart to the emulsion the desirable properties of water-base drilling fluids and oil-base drilling fluids.

In drilling an oil or gas well by means of rotary drilling tools, a hollow drill pipe known as a drill stem having a bit attached to the lower end is extended downwardly through the well bore and rotated while the bit is pressed against the working face in the formation at the bottom of the hole. The action of the rotating bit grinds away the formation rock as the drilling progresses. A fluid commonly termed a drilling mud is circulated downwardly through the drill stem, through the bit against the working face of the hole and then upwardly toward the surface through the annular space between the drill stem and the wall of the borehole. This drilling fluid serves a number of purposes among which are cooling and lubricating the drill bit, suspending and removing cuttings from the borehole, sealing the borehole wall to prevent loss of drilling fluid into the surrounding formation, preventing the flow of fluids from the formation into the borehole by applying a hydrostatic pressure to the formation, and fulfilling other requirements.

Drilling fluids in common use in field practice at the present time may be divided conveniently into three classes depending upon their constitution and physical properties. These classes include the water base, the oil base, and the oil and water emulsion type of drilling fluids, the latter being a combination of the first two classes. The present invention is primarily directed toward an improved type of emulsion drilling fluid which possesses in a single fluid many of the advantages individually characterizing the oil-base and water-base fluids.

Any drilling fluid must have certain desirable physical properties and characteristics for satisfactory use in drilling. It must have only a small tendency to lose fluid through the borehole wall into the formation and it must effectively seal the surface against the flow of fluids from the formation into the hole. The physical property which regulates this ability may be determined through a relatively simple filtration test described in "Recommended Practice on Field Procedure for Testing Drilling Fluids" A. P. I. Code No. 29, Second Edition published July 1942. The result is expressed in ml. of filtrate per unit time, periods of 15 minutes, 30 minutes and one hour being common. The property is also termed the wall building, cake forming, filter loss, sealing, or filtration characteristic.

A successful drilling fluid, water base, oil base, or emulsion base, must have a satisfactory viscosity in order that the fluid will readily lend itself to circulation through the hole during drilling. The viscosity must be sufficiently high that cuttings broken away from the working face at the bottom of the hole will be supported in the fluid and carried out of the well. The viscosity must be sufficiently low so that excessively high mud pump pressures are not required to effect a mud circulation at the rate desired. A measurement of drilling fluid viscosity known as the Marsh or funnel viscosity may be made following a standardized procedure given in "Recommended Practice on Field Procedure for Testing Drilling Fluids" A. P. I. Code No. 29, Second Edition, Published July 1942. The viscosity is determined by the time in seconds required for a given volume to pass through the restricted opening at the bottom of the funnel. In oil field drilling practice where large quantities of drilling fluids are employed, 1500 ml. are measured into the funnel, the viscosity is given in seconds required for one quart, or 946 ml., to run out. In the laboratory where it is occasionally difficult to obtain large samples, an indication of the viscosity may be determined from the time required for 500 ml. of drilling fluid placed in the funnel to run out.

The thixotropic properties of the fluid such as the gel strength should be good in order that both weighting agents which may be added as well as drill cuttings broken away from the working face of the bore will not settle and plug the hole when circulation is stopped.

The drilling fluids of the present invention are believed to be superior to conventional water-base and oil-base drilling fluids previously employed since the advantages of both classes of drilling fluids are combined in one drilling fluid. The requirement for considerable quantities of expensive ingredients required in the formulation of certain improved type water-base drilling fluids has been eliminated. The drilling fluid of the present invention is highly adaptable to drilling such formations as heaving shale in which there is a strong tendency for the formation to swell and fill in the hole which sometimes results in the necessity for abandoning the well. Many oil-base drilling fluids previously proposed comprise substantial quantities of normally solid petroleum materials such as asphalt which are difficult to prepare and use. The drilling fluids of the present invention are easily prepared and handled and are substantially less inflammable than many oil-base fluids previously employed. Substantially all of the foremost disadvantages of oil-base and water-base drilling fluids have been eliminated and the advantages combined in the improved emulsion type drilling fluid of the invention.

It is a primary object of the present invention to provide an improved drilling fluid having substantially all of the desirable characteristics of both water-base and oil-base drilling fluids proposed previously.

It is another object of this invention to provide an improved drilling fluid which comprises an unusually stable emulsion of water and oil containing a water-soluble salt which when employed in drilling through production formations has the desirable effect of increasing the formation permeability and increasing the oil production rate.

Another object of this invention is to provide a drilling fluid which comprises a salt-containing emulsion of oil and water stabilized by a nonionic emulsifying agent and which is characterized by its low filtration rate, its high stability, and its desirable viscosity.

Another object of this invention is to provide a method for preparing the salt-containing emulsion drilling fluids hereinafter more fully described.

A further object of this invention is to provide an improved method of drilling oil or gas wells in which the emulsion drilling fluid herein described is employed.

Other objects and advantages of this invention will become apparent to those skilled in the art as the description thereof proceeds.

Briefly, the present invention comprises a drilling fluid which consists of a salt-containing emulsion of oil and water containing a nonionic emulsifying agent. Other agents may be incorporated to increase emulsion stability, to enhance thixotropic properties, and to increase the specific gravity of the fluid. Such a drilling fluid permits the combination of the highly desirable properties of both water-base and oil-base fluids in the improved drilling fluid of this invention. By judicious selection of the constituents employed in preparing the drilling fluids as hereinafter more fully described, a salt-containing emulsion of oil and water having a high degree of stability may be prepared. Hydratable clay such as Wyoming bentonite or the like is preferably added to increase emulsion stability to enhance thixotropic properties of the fluid, and to act as a wall building agent. Such agents may be added either to the water or to the oil. Weighting agents to increase specific gravity may be employed if desirable. The agents in the drilling fluid of this invention which permit formation of salt-containing emulsions are preferably of the nonionic variety or in general are those which are not precipitated or otherwise deleteriously effected by the presence of highly ionic constituents such as water-soluble salts. The term salt as used in this specification is taken to include the water-soluble salts of strong acids and of metals above iron in the electromotive series of metals.

Briefly, one method of preparation of these drilling fluids comprises the addition of the desired amount of salt to the desired amount of water to form a clear solution. Subsequently the hydratable clay is added if desired, and thoroughly mixed and suspended in the salt solution or brine. When a substantially complete dispersion of hydratable clay is obtained, the nonionic emulsifying agent is incorporated and the resulting fluid is thoroughly agitated in order to effect thorough dispersion. The desired quantity of oil is then added which may be a heavy or moderately heavy mineral oil, although other types of oil such as coal tar oil or heavy vegetable oil residuums may be employed. The oil and the dispersion previously prepared are thoroughly agitated to form an emulsion and the entire mass is heated to a temperature preferably somewhat in excess of about 120° F. to form a stable oil and water emulsion even though it contains a considerable quantity of salt.

In another method of preparing these drilling fluids, the wall building agents may be first incorporated into the oil such as clay, oil-dispersible soaps, and the like. This treated oil may then be worked into the brine containing the nonionic emulsifying agent exactly in the same manner as given above to form the final emulsion. The clay addition to the water may be eliminated.

The preferred salts to be incorporated in the emulsion drilling fluids of the present invention are those which cause a decrease in the specific volume of argillaceous materials frequently found in oil producing formations. Such an effect results in an immediate increase in the formation permeability to the flow of fluids such as oil, water or gas and consequently the rate of oil production from an oil or gas well is thus increased. The producing formations of the California oil fields in particular may be advantageously treated by drilling muds containing salts of the type described above since they are known to contain argillaceous materials, believed to be sodium clays, which markedly decrease in volume through contact with such ionic constituents as the salts of the alkaline earth metals. Treatment of such formations with filtrates containing water-soluble salts of calcium in particular are effective in increasing formation permeability. The degree of effectiveness of the water-soluble salts of ammonia and the alkali metals is somewhat less in this respect, but beneficial effects in oil well drilling are noted. The preferred salts therefore are water-soluble salts of the alkaline earth metals and particularly of calcium such as calcium chloride since the degree of permeability increase per unit concentration of water-soluble salt in the drilling fluid appears to be greatest when water-soluble salts of calcium are employed.

The quantity of water-soluble salt incorporated into the drilling fluids of the present invention may be varied from as low as less than about 0.1% by weight to as high as about 10.0% by weight. With calcium chloride, water-soluble salt concentrations of between about 0.5% to as high as about 5.0% by weight are preferable. In using the water-soluble salts of ammonia or the alkali metals, concentrations in the upper end of the range previously given are required to effect the desirable results. When salts of the alkaline earth metals are employed, concentrations near the lower end of the range have been proved satisfactory.

The drilling fluids of this invention desirably contain a minor but effective proportion of hydratable clay, such as for example, Wyoming bentonite. The presence of small amounts of this type of clay acts to assist in stabilizing the drilling fluid emulsion, to form a cake on the face of the borehole, and to enhance the thixotropic properties of the fluid. The gel strength of a drilling fluid is of considerable importance and between as low as about 2.0% to as high as about 25.0% by weight of a hydratable clay imparts such desirable characteristics to the drilling fluids of this invention.

The presence of saline materials, the water-soluble salts described above, exerts a marked flocculative effect on colloidal clays whether these are included in the drilling fluid during its formulation or are the argillaceous materials present in the porous formation through which the borehole is drilled. The divalent metal salts in particular have such an effect. In order to preserve the state of the colloidal clay present in the drilling fluid so as to realize the inherent advantages of its presence, the emulsifying agents employed in preparing the improved emulsified drilling fluids of this invention must be capable of maintaining the clay present in the drilling fluid in a deflocculated state as well as permitting a highly stable emulsion of oil and salt-containing water to be formed. The use of conventional emulsifying agents such as metal soaps of naphthenic, aliphatic, aromatic, and other acids is not as well suited to this service as are certain selected nonionic types of emulsifying agents. It has been found that in the formulation of emulsion-type drilling fluids according to this invention the use of nonionic emulsifying agents is required because of the presence of saline materials in the mixture which normally destroy emulsions and the deflocculation of clay wherein ionic emulsifiers are used.

Nonionic emulsifying agents which may be employed to prepare the drilling fluids described herein comprise such materials as starch, the water-dispersible alkoxy derivatives of cellulose such as, for example, methoxy cellulose which is known commercially as methyl cellulose, ethyl cellulose, and the like, the water-dispersible gums such as gum arabic, gum karaya, gum acacia, gum tragacanth, and other natural occurring gum like materials, or the alkali metal hydroxide reaction products of natural gums. Of this group the particularly preferred agents are starch or methyl cellulose or any of the water-dispersible cellulose derivatives similar to methyl cellulose since best results have been obtained with these.

The quantities of nonionic emulsifying agents to be employed in the drilling fluids of the present invention may vary from as low as about 0.1% by weight to as high as about 10.0% by weight or higher depending in general upon the quantity and nature of the saline constituents in the fluid as well as the nature and the quantity of oil subsequently introduced to form the final drilling fluid product. Satisfactory drilling fluids have been prepared in which between about 0.5% and about 5.0% by weight of starch has been employed. Other satisfactory drilling fluids have been prepared in which between about 0.3% and about 5.0% by weight of methyl cellulose have been employed. Through the use of such nonionic emulsifying agents, drilling fluids may be obtained which are substantially completely unaffected by the calcium ion which frequently contaminates drilling fluids employed in drilling through formations containing substantial quantities of limestone or gypsum, where the drilling fluid is employed in drilling through a cement plug, or where calcium ion is deliberately added as in the fluids of this invention. Such drilling fluids are likewise uneffected by some of the conventional weighting agents such as barytes, chalk, lime or other materials.

The gelatinized starch is preferably water-dispersible type and performs as a nonionic emulsifying agent as well as being a protective colloid to aid in improving the filtration characteristics of the drilling fluid. This type of starch includes the gelatinized starch or cooked starches prepared from grain, wheat or other cereal grains, or any other vegetable sources in the well known manners.

The preferred water-dispersible alkyl cellulose derivatives employed in the practice of this invention comprises a commercially available methyl cellulose marketed in a variety of grades with viscosities of 15, 25, 100, 400, 1500 and 4000 centipoises. A rather wide range of viscosity effects may be obtained by incorporating various quantities of the various grades of methyl cellulose in the drilling fluid. The most desirable methyl cellulose has been found to be the grade labeled 400 CPS, that is to say, a 2.0% dispersion of this material in water has a viscosity of 400 centipoises. Dissolution of these methyl celluloses in water forms clear, viscous liquids free of suspended solids, the viscosities of which are dependent upon the concentration and the grade of methyl cellulose employed.

The methyl celluloses preferred as treating agents in the present invention may be prepared by repeatedly treating one mol of cellulose with 2.5 mols of caustic soda in water and 3.0 mols of methyl sulfate until analysis shows a methoxy content of at least 20% by weight. Caustic soda solutions of 20% by weight concentration are first used to treat the cellulose followed by a maceration step, which in turn is followed up by addition of the methyl sulfate as the alkylating agent. Other alkylating agents including alkyl halides may be employed such as methyl iodide. The methyl, ethyl and similar low molecular weight alkyl or hydroxy alkyl cellulose derivatives which are readily water-dispersible are applicable to the preparation of the drilling fluids of this invention.

These alkyl cellulose derivatives are radically different from those previously proposed for the preparation of drilling fluids wherein other cellulose derivatives are incorporated. Cellulose-containing drilling muds have previously been prepared by the dissolution of cotton or cotton linters or of celluloses prepared from wood in concentrated solutions of a divalent metal salt such as zinc chloride or other aqueous solution capable of dissolving cellulose. Drilling muds containing cellulose thus prepared are readily decomposable by the addition of acids, by heating and by other means since the cellulose is present in a regeneratable form. Drilling fluids thus prepared are inferior to the drilling fluids of the present invention since the dissolved cellulose is present in a regeneratable form. The alkyl celluloses employed in drilling fluids of the present invention are not regeneratable and they are not decomposable in the presence of salts or acids, or methods conventionally applied to the regeneration of cellulose.

It has also been proposed to employ cellulose derivatives in drilling muds wherein alkali metal carboxy methyl celluloses are employed. It is desirable here to point out that the alkyl cellulose derivatives employed in the drilling muds of the present invention are superior to the drilling fluids containing such alkali metal carboxy methyl cellulose derivatives since sodium carboxy-methyl cellulose, for example, has only limited solubility in the presence of metal ions of the alkaline earth group. Water-soluble salts of the alkaline earth metals, such as calcium chloride, comprise the preferred saline addition agents in the drilling fluids of the present invention. Such salts form insoluble products through interaction with the carboxy-methyl cellulose. Sodium carboxy-methyl cellulose further forms insoluble salts of cellulose glycollic acid with such divalent and polyvalent metal ions such as zinc, copper, aluminum, tin, silver, chromium, iron and titanium. These metal ions have virtually no effect on the preferred cellulose derivatives of the drilling fluids of the present invention.

Some of the divalent metal ions mentioned above, and particularly calcium and magnesium, are found in the connate waters present in porous formations through which wells may be drilled. The presence of such metal ions in contact with a drilling fluid prepared from an alkali metal carboxy methyl cellulose has pronounced deleterious effects upon the physical properties of such drilling fluids; whereas, the presence of these metal ions in contact with the drilling fluids according to this invention which contain an alkyl cellulose derivative, actually improves the drilling mud as indicated by the change in such physical properties as the filtration rate and the Marsh viscosity.

In preparing the final fluid product for use as drilling fluids, the water-base drilling fluid, containing saline constituents in the presence of a minor but effective proportion of a hydratable clay and the nonionic emulsifying agent, is mixed with a selected oil to form a stable emulsion having the desired physical properties. It has been found that a fairly wide variety of oils may be employed including mineral oils and mineral oil fractions such as crude petroleum, fractions prepared during the refining of petroleum, and oil fractions separated from the distillates obtained during the coking of coal. It may be possible that certain vegetable oil products may also be employed. The choice of the type and grade oil employed in the preparation of these improved drilling fluids may depend largely on local circumstances concerning the availability of various grades and types of oil. In many cases it is possible to employ stabilized crude petroleums which have gravities of between about 10° and 30° A. P. I., for example. Crude petroleum from the Orcutt Field of Southern California has proved satisfactory in preparing these drilling fluids. Fractions of crude petroleums such as lubricating oil extracts, cracked and straight run residual oils, fuel oils, road oils, and the like, are effective. It may be that certain types of asphalts, particularly the low melting point types, may be incorporated either alone or in conjunction with some of the aforementioned petroleum fractions. Asphalts, however, are not the preferred types of oil. Oils obtained through the fractionation of distillates formed during coal coking form very desirable oils suitable for preparation of these drilling fluids. It may be desirable, however, to exclude the basic and acidic constituents of such distillates to eliminate as nearly as possible the problem of corrosion. Such a separation may be made according to conventional procedures of caustic washing to remove phenolic bodies and acid washing to remove nitrogenous materials to leave a neutral aromatic oil. Fractionation of this material to separate the heavier portion therefrom produces an aromatic oil well suited for use in the drilling fluids of this invention. Under certain conditions it may be desirable to use the lighter fractions of either mineral or coal oils in which case materials having gravities as high as 45° A. P. I. may be employed. Furthermore, it is not outside the scope of this invention to substitute animal oils such as fish oil, whale oil and similar materials for the preferred mineral oils described above since satisfactory emulsions may be obtained.

The quantity of oil thus employed may range from as low as 5.0% to as high as about 80.0% by volume of the finished fluid. Particularly desirable fluids have been obtained wherein the oil amounted to between about 10.0% and 50.0% by volume of the product.

The Marsh viscosity of these drilling fluids may range from as low as about 60 seconds to as high as about 200 seconds or higher. The preferable range would be between about 80 and 150 seconds for a 1500 ml. in one quart out measurement.

An important consideration in the formulation of the drilling fluids of this invention resides in the method with which the various ingredients are brought together. This method of preparation may be illustrated by reference to the following example:

Example I

A 220 gallon batch of drilling fluid may be prepared by placing 825 pounds of water in a vessel of suitable size. Subsequently 25 pounds of calcium chloride are dissolved in the water to form a clear solution. To this solution is then added 120 pounds of Rogers Lake dry mud and the mixture thus formed is thoroughly agitated to form a uniform suspension. When a substantially complete dispersion of the clay is obtained, 30 pounds of gelatinized starch is added to the mixture to form about 110 gallons of fluid. This material has a density of 68 pounds per cubic foot, a Marsh viscosity 500/500 of about 40 seconds and a water loss rate of about 4 ml. in 15 minutes. To this material is added 22 gallons of Orcutt crude oil and the resulting mixture is thoroughly agitated. In order to form a stable emulsion from the materials thus mixed together the entire mass is heated to a temperature in excess of about 120° F. with agitation, and a stable emulsion results. This drilling fluid has a weight of about 65 pounds per cubic foot and shows no tendency to separate upon standing. The drilling fluid thus prepared contains the following:

| Ingredient: | Per cent by weight |
|---|---|
| Gelatinized starch | 2.6 |
| Calcium chloride | 2.2 |
| Rogers Lake dry mud as the hydratable clay | 10.4 |
| Water | 72.0 |
| Stabilized Orcutt crude petroleum | 12.8 |
|  | 100.0 |

This drilling fluid has a filtration rate of about 0.8 ml. in 15 minutes. The quantity of Orcutt crude thus incorporated amounts to about 20% by volume of the original aqueous suspension of clay prepared as described above.

It has been found possible to incorporate as high as 100% by volume of a straight run residual oil or one volume of oil per volume of aqueous clay suspension. This may be shown by reference to the following example:

Example II

An aqueous clay suspension is prepared according to the procedure outlined in Example I in which the starch of Example I is substituted with commercial methyl cellulose to form an aqueous clay suspension containing:

|  | Pounds |
| --- | --- |
| Water | 815 |
| Dry Rogers Lake mud | 120 |
| Barium chloride | 25 |
| Methyl cellulose | 20 |

About 110 gallons of aqueous clay suspension is thus formed. This material is thoroughly agitated and gradually heated to a temperature of about 150° F., and 110 gallons of a straight run residual oil is gradually mixed with the agitated clay suspension to form a dark colored emulsion. This emulsion, containing 50% by volume of oil, has a density of about 62 pounds per cubic foot and has a filter loss of less than 0.5 ml. in 15 minutes.

Example III

An aqueous solution containing 5.0% by weight of potassium sulfate was prepared and 40 parts by weight of the solution was combined with one part by weight of gelatinized starch. About 4.0% by weight of calcium rosin acid soap was added to a lubricating oil extract and 59 parts of the thus treated extract was incorporated into the potassium sulfate solution with agitation. The mass was heated to a temperature of 145° F. for one hour and then cooled. A stable uniform emulsion having a weight of 58 pounds per cubic foot resulted. Analysis showed a filter loss of only 0.6 ml. in 15 minutes.

Example IV

The substitution of ammonium sulfate for the potassium sulfate of the preceding example resulted in the formulation of a satisfactory emulsion. The filter loss was 0.7 ml. in 15 minutes.

Example V

An aqueous solution of aluminum sulfate (3.0% by weight) was prepared and 30 parts by weight of this brine, 2 parts by weight of commercial methyl cellulose, and 13 parts by weight of Wyoming bentonite were agitated together to form a suspension. Gradually 55 parts by weight (about 65 parts by volume) of an aromatic coal oil residuum having a gravity of about 20° A. P. I. was incorporated into the suspension. The mixture was gradually heated while agitating to 160° F. for about one hour and cooled. The resulting material was a completely stable emulsion containing 0.9% by weight of aluminum sulfate. The Marsh viscosity (1500/1-qt.) was 160 seconds and the filter loss was 0.7 ml. in 15 minutes.

Example VI

An emulsion drilling fluid was made employing 35 parts by weight of a 4.0% by weight solution of chromous chloride with 1.5 parts by weight of gum karaya. Thirteen and one-half parts by weight of a hydratable clay was added to the brine mixture. The mixture was agitated and heated to a temperature of 135° F. while the continuous addition of 50 parts by weight of straight run residual petroleum oil was made. The resulting emulsion when cooled was stable and did not tend to separate on standing. The filter loss was found to be 0.7 ml. in 15 minutes.

Preparation of similar drilling fluids as those described in the above examples may be carried out using such salts as barium nitrate, magnesium chloride, strontium chloride, sodium chloride, sodium sulfate, ammonium sulfate, and other water-soluble salts of such other metals as beryllium, manganese, chromium, zinc, iron, and the like. Other oils may also be employed such as lubricating oils and extracts thereof as well as coal tar distillation residues. The expense of preparation of such drilling fluids is less than that of a conventional water-base mud because a considerable volume of relatively inexpensive oil is employed. Because of the presence of the oil in the drilling fluid together with the gel-forming agent such as starch or methyl cellulose, highly desirable wall building or wall sealing characteristics are imparted to the drilling fluid. The presence of the oil further tends to decrease the friction between the rotating drill stem and wall of the borehole thus reducing the power required for drilling. The difficulties involved in drilling through heaving shale formations are materially reduced because of the fact that the amount of filtrate lost into the formation is quite small and it contains, in its preferred modification, calcium ions which tend ot decrease the volume of the clay rather than increase it. Caving problems are thus substantially eliminated. These desirable characteristics which may be attributed to the presence of saline constituents in the drilling fluid are not realized at the expense of introducing deleterious effects which prevent, for example, running of an accurate electric log of the borehole.

Certain modifications exist in the method by which drilling fluids according to this invention are prepared. For example, the clay may be incorporated in the water prior to the addition of the starch and water-soluble salt if desirable. The material is then thoroughly mixed in order to obtain a homogeneous mass. In another modification the desired quantity of water-soluble salt may be dissolved in the water followed by dispersion of the desired quantity of dry mud in the brine thus formed. By allowing the clay suspension resulting to stand for a period of about 24 hours a sufficient degree of clay hydration results following which the desired amount of starch or methyl cellulose or other nonionic emulsifying agent may be incorporated followed by the required quantity of oil.

The drilling muds of the present invention have minimum densities in the range of about 56 pounds per cubic foot. When drilling through formations in which gases or liquids exist under elevated pressures, drilling fluids having higher weights are required to apply a sufficiently high hydrostatic pressure to the high pressure formation to effectively prevent blowouts of gas or liquid. Under such conditions it is necessary to incorporate suitable weighting agents in the mud to increase the effective density to as high as 90 or 100 pounds per cubic foot or higher. Such weighting agents in general include insoluble inorganic compounds of the heavy metals such as barium sulfate, barium carbonate, ferric oxide or red pigment, plumbic oxide or litharge, galena, silica, pulverized oyster shells, chalk, limestone, or other inorganic compounds having a high specific gravity. By incorporating such weighting agents as finely divided solids in the improved drilling fluids of this invention, densities as high as about 120 pounds per cubic foot may be obtained.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A drilling fluid which comprises an emulsion of between 5.0% and 80.0% by volume of a mineral oil, water, between about 0.1% and 10.0% by weight of a water-soluble salt of an alkaline earth metal and between about 0.1% and about 10.0% by weight of an emulsifying agent selected from the class of water-dispersible nonionic emulsifying agents consisting of starch, alkoxy derivatives of cellulose, natural gums, and alkali metal hydroxide reaction products of natural gums.

2. A drilling fluid according to claim 1 wherein said water-soluble salt comprises an alkaline earth metal salt of a strong acid.

3. A drilling fluid according to claim 1 wherein said water-soluble salt comprises calcium chloride.

4. A drilling fluid according to claim 1 in the presence of between about 2.0 and about 25.0% of a hydratable clay.

5. A drilling fluid according to claim 1 in which the emulsifying agent is gelatinized starch.

6. A drilling fluid according to claim 1 in which the emulsifying agent is methyl cellulose.

7. A drilling fluid according to claim 1 in which the emulsifying agent is a natural gum.

8. A drilling fluid according to claim 1 which is prepared by thoroughly mixing the constituents together and heating the resulting emulsion to a temperature above about 120° F. but below the de-emulsification temperature to stabilize said emulsion.

9. A drilling fluid which comprises a stable salt-containing oil in water emulsion containing between about 0.1% and about 10.0% by weight of an alkaline earth metal salt, between about 0.1% and about 10.0% by weight of a water-dispersible alkoxy derivative of cellulose, and from about 5.0% to about 80.0% by volume of a hydrocarbon oil.

10. A drilling fluid according to claim 9 wherein said hydrocarbon oil has a gravity of between about 10.0° and 30.0° A. P. I.

11. A drilling fluid which comprises an emulsion of crude petroleum in water which contains between about 0.5% and about 5.0% by weight of calcium chloride, said emulsion containing a water-dispersible nonionic emulsifying agent selected from the group of water-dispersible nonionic emulsifying agents consisting of starch, alkoxy derivatives of cellulose, natural gums and alkali metal hydroxide reaction products of natural gums.

12. A drilling fluid according to claim 11 wherein said nonionic emulsifying agent comprises between about 0.3% and about 5.0% by weight of commercial methyl cellulose.

13. A drilling fluid according to claim 11 wherein said nonionic emulsifying agent comprises between about 0.5% and about 5.0% by weight of gelatinized starch.

14. A drilling fluid which comprises an emulsion of between about 10.0% and 50.0% by volume of a mineral oil, water, between about 0.5% and 5.0% by weight of a water-soluble salt of an alkaline earth metal, between about 0.5% and about 5.0% by weight of gelatinized starch and between about 2.0% and 25.0% by weight of a hydratable clay.

15. A drilling fluid which comprises an emulsion of between about 10.0% and 50.0% by volume of a mineral oil, water, between about 0.5% and 5.0% by weight of a water-soluble salt of an alkaline earth metal, between about 0.3% and about 5.0% by weight of a water-dispersible alkoxy derivative of cellulose and between about 2.0% and about 25.0% by weight of a hydratable clay.

16. A method for the preparation of salt-containing drilling fluid emulsions which comprises emulsifying water containing between 0.1% and 10.0% by weight of a water-soluble salt of an alkaline earth metal with a hydrocarbon oil in the presence of a nonionic emulsifying agent selected from the group of water-dispersible nonionic emulsifying agents consisting of starch, alkoxy derivatives of cellulose, natural gums and alkali metal hydroxide reaction products of natural gums and heating the resulting mixture to a temperature in excess of about 120° F. but insufficient to break the emulsion.

17. A method for the preparation of salt-containing drilling fluid emulsions which comprises forming an aqueous solution of a water-soluble salt of an alkaline earth metal in sufficient amount to give the final fluid a salt concentration of between 0.1% and 10.0% by weight adding a hydratable clay to said solution and mixing to form a uniform suspension, adding a sufficient amount of methyl cellulose to said suspension to form a stable emulsion, incorporating from about 5.0% to about 80.0% by volume of a hydrocarbon oil with agitation and heating the total quantity of material thus formed to a temperature in excess of 120° F. but insufficient to break the resulting emulsion to form said stable salt-containing drilling fluid emulsion.

PAUL W. FISCHER.

REFERENCES CITED

The following references are of record in the file of this patent:

UNITED STATES PATENTS

| Number | Name | Date |
|---|---|---|
| 2,151,029 | Henst | Mar. 21, 1939 |
| 2,322,822 | Brown | June 29, 1943 |
| 2,337,296 | Kennedy et al. | Dec. 21, 1943 |
| 2,360,992 | Weiss | Oct. 24, 1944 |
| 2,380,156 | Dobson et al. | July 10, 1945 |
| 2,417,307 | Larsen | Mar. 11, 1947 |
| 2,423,144 | Gregg | July 1, 1947 |
| 2,425,768 | Wagner | Aug. 19, 1947 |
| 2,488,304 | Malott | Nov. 15, 1949 |

OTHER REFERENCES

"Spands and Tweens"—Booklet pub. (1942) Atlas Powder Co., Wilmington, Del. pg. 7.

Schwartz et al.—Surface Active Agents—pub. 1949 Interscience Pub. Inc., N. Y. pg. 209.

The New Methocel—Booklet pub. 1948, 1949 by Dow Chem. Co. Midland, Mich. pg. 52.